US006657996B1

(12) United States Patent
Mladenovic et al.

(10) Patent No.: US 6,657,996 B1
(45) Date of Patent: Dec. 2, 2003

(54) APPARATUS AND METHOD FOR IMPROVING VOICE QUALITY BY REMOVING TANDEM CODECS IN A VOICE COMMUNICATION LINK

(75) Inventors: Zoran Mladenovic, Bethesda, MD (US); Nagendra Kumar, McLean, VA (US); Edward B. Morgan, Gaithersburg, MD (US)

(73) Assignee: Telogy Networks, Inc., Dallas, TX (US)

( * ) Notice: Subject to any disclaimer, the term of this patent is extended or adjusted under 35 U.S.C. 154(b) by 0 days.

(21) Appl. No.: 09/295,450

(22) Filed: Apr. 21, 1999

(51) Int. Cl.[7] .......................... H04L 12/28; H04L 12/64
(52) U.S. Cl. ...................................................... 370/356
(58) Field of Search .................. 379/88.11, 90.01, 379/93.01, 93.08; 370/310, 350, 464, 480, 493, 495, 496, 497, 401, 351, 352, 522, 523, 356

(56) References Cited

U.S. PATENT DOCUMENTS

| | | | | |
|---|---|---|---|---|
| 5,768,308 A | * | 6/1998 | Pon et al. ..................... | 370/287 |
| 5,903,862 A | * | 5/1999 | Weaver et al. ............... | 704/212 |
| 5,956,673 A | * | 9/1999 | Weaver et al. ............... | 455/436 |
| 5,991,716 A | * | 11/1999 | Lehtimaki .................... | 704/212 |
| 6,006,189 A | * | 12/1999 | Strawczynski et al. ...... | 704/201 |
| 6,108,560 A | * | 8/2000 | Navaro et al. ............... | 370/468 |
| 6,125,120 A | * | 9/2000 | Lehtimaki .................... | 370/435 |
| 6,167,040 A | * | 12/2000 | Haeggstrom ................. | 370/352 |
| 6,172,974 B1 | * | 1/2001 | Tseng et al. .................. | 370/357 |
| 6,230,120 B1 | * | 5/2001 | Suvanen ....................... | 704/201 |
| 6,256,612 B1 | * | 7/2001 | Vo et al. ....................... | 704/201 |
| 6,324,409 B1 | * | 11/2001 | Shaffer et al. ............... | 455/552 |
| 6,356,593 B1 | * | 3/2002 | Dagedeviren et al. ...... | 375/242 |

OTHER PUBLICATIONS

3GPP specifications—List of all specification numbers and titles—Sep. 2001.
TS 101 108 V5.0.0 (1997–11), Digital cellular telecommunications system (Phase 2+); Tandem Free Operation (TFO); Service description; Stage 1, European Telecommunications Standards Institute.
Committee TR45 Contribution, TIA TR 45.4, Ericsson Eurolab Deutschland GmbH, Vocoder Bypass==Tandem Free Operation.
TS TDMA_TFO V0.1.3 (1999–03), Digital cellular telecommunications system; Inband Tandem Free Operation (TFO) of Speech Codecs; (TDMA_TFO version 0.1.3 Release 1999) ETSI.

* cited by examiner

Primary Examiner—Melvin Marcelo
Assistant Examiner—Derrick W Ferris
(74) Attorney, Agent, or Firm—Warren L. Franz; W. James Brady; Frederick J. Telecky, Jr.

(57) ABSTRACT

A system and method for reducing or eliminating degradation in voice transmission quality resulting from repeated or sequential compression and decompression of voice packets over one or more packet networks. When a voice connection is established between two parties on separate packet networks, the signal is often passed through a PBX and/or over PSTN lines, with the occurrence of two tandem low-bit-rate codecs used to transfer the signal and introducing degradation of voice quality. This situation arises frequently in voice-over-packet applications. The situation can also arise when a call is forwarded from one place to another. The present invention reduces the degradation associated with the transport of voice data and thereby improving the voice quality by removing one of the tandem codecs.

9 Claims, 3 Drawing Sheets

APPARATUS AND METHOD FOR IMPROVING VOICE QUALITY BY REMOVING TANDEM CODECS IN A VOICE COMMUNICATION LINK

BACKGROUND OF THE INVENTION

1. Field of the Invention

The invention relates to methods and apparatus for improving voice quality in compressed audio signals transmitted over packet networks. More specifically, the invention relates to methods and apparatus for reducing the degradation of the quality of the voice transmission due to repeated compression and decompression.

2. Description of the Background Art

Voice connections are commonly established using packet networks. Once a connection over a packet network is established, signals are sent over the network in packets. The signals sent over the network are digitized from either analog or digital sources. To transmit voice over a packet network, the voice signal is compressed and placed into data packets. These packets are transmitted over a packet network, received at the other end, decompressed and passed on as voice information. Three kinds of packets are normally transmitted over the packet network in a voice connection. These are:

Voice packets. These packets contain compressed voice. Their size varies depending on the codec in use.

SID packets. These packets are transmitted at the beginning of a silence interval. By using these packets, the packet network bandwidth is saved, as compared to what it would cost by sending the silence compressed as voice packets.

DTMF packets. DTMF tones do not compress and reproduce well enough for the telephony equipment to work properly if compressed using some popular low-bit-rate voice codecs. Therefore, these tones are identified and transmitted in a different packet format over the packet network. This also provides the opportunity of moving DTMF signaling to out-of-band signaling, and vice versa.

In certain situations a connection is established between two packet networks over a PBX/PSTN interconnection. In these circumstances the data will travel over PSTN lines as digital PCM samples.

In addition, some signaling packets are also passed that are used for maintaining the connection. DTMF tones, and some other tones, are used by the Central Office PBX for establishing the connection in the beginning of a call. However, once a voice connection has been established, it is generally assumed that the routing equipment (PBX) will not make use of DTMF digits. Therefore, they can be transported over the PCM interface in a packet format.

Since the data may have to travel over PSTN lines as PCM samples, it is important to consider the following properties of PSTN lines:

Bit robbing. In North America, one least significant bit of every sixth frame is robbed and used for signaling in channel associated signaling schemes. This means that one out of six bits will be corrupted. Further, sequential PBX switches will also rob every sixth frame of the LSB. However, the robbed bit will most likely not be the same sixth bit, resulting in two or more bits out of six robbed, increasing the difficulty of identification of any sequence embedded in the LSB.

Frame slips. Frame slips may occur over PSTN lines. If a frame slip occurs, one PCM frame may be either lost, or repeated twice. In the worst case, it can be anticipated that these will occur every 5.6 seconds. This phenomenon may interfere both with signature sequence detection, and packet retrieval/synchronization.

Digital pads. We will assume that there are no digital pads over the link.

Asynchronous tandem T1 links. Asynchronous tandem T1 links may cause more than one out of six LSB of the PCM samples to be corrupted.

The invention is applicable to the situations where two or more codecs appear in a series in a voice connection. Every time voice is encoded and decoded through a low-bit-rate codec, there is degradation in the voice quality. FIG. 1 illustrates a telecommunication connection over a PBX utilizing Golden Gateway software from Telogy Networks, Inc. In FIG. 1, a connection between two terminal pieces of telecommunication equipment 10 and 11 has been established over two packet networks, through a PBX/central office 12 that is remote to both 10 and 11. The equipment 10 and 11 can be telephones, facsimile machines, computers, voice processing equipment or any combination of telecommunication equipment. Once a connection has been established between the equipment 10 and 11, the first gateway 13 uses a first codec to compress voice 13 over the first packet network 14. Then the voice packets are decompressed by gateway 15 and transmitted as PCM samples over the Central Office PBX/PSTN lines 16. The voice signal is received by gateway 17 and compressed again for transmission over the second packet network 18 and where it is received and again decompressed by gateway 19 and provided to second telephone 11.

The use of two codecs in series, tandem codecs, requires repeated compression and decompression. Repeated compression and decompression result in degradation in voice quality. Such a situation may also arise in the presence of call-forwarding over two long-distance links.

SUMMARY OF THE INVENTION

The present invention alleviates the degradation in voice quality caused by successive compression and decompression by sending the compressed voice packets on the first packet 14 network directly to the second packet network 15 without decompression and recompression. This form of transmission is referred to herein as tandem transparent mode. In order to accomplish this, the present invention teaches to embed the packet information in compressed form into the voice connection of PCM samples. However, to achieve this result, the gateways 15 and 17 must be able to realize that the other gateway is not terminal equipment (e.g., a telephone, facsimile machine, or the like). Both gateways 15 and 17 must recognize the other as a forwarding gateway that normally compresses/decompresses and forwards the compressed voice packets over a packet network or forwards the voice signal to the terminal equipment. By recognizing the other gateway on the other side of the PBX, each gateway can eliminate decompression and transmit the compressed voice packets as data within the PCM samples (transparent mode). The receiving gateway will recognize the PCM samples as packet data and forward the packets on to the packet network without recompression, achieving improved voice quality. The connecting gateways can only detect the possibility of tandem codecs after the voice connection has been established.

BRIEF DESCRIPTION OF THE DRAWINGS

For a better understanding of the nature of the present invention, reference is had to the following figures and detailed description, wherein like elements are accorded like reference numerals, and wherein:

FIG. 2 is a diagram illustrating an exemplary embodiment for embedding a first signature sequence within a PCM sample.

FIG. 3 is a diagram illustrating an exemplary embodiment for the formatting of a packet start marker and data packet with a second signature sequence embedded within PCM samples.

DETAILED DESCRIPTION OF PREFERRED EXEMPLARY EMBODIMENTS

Figure 1:
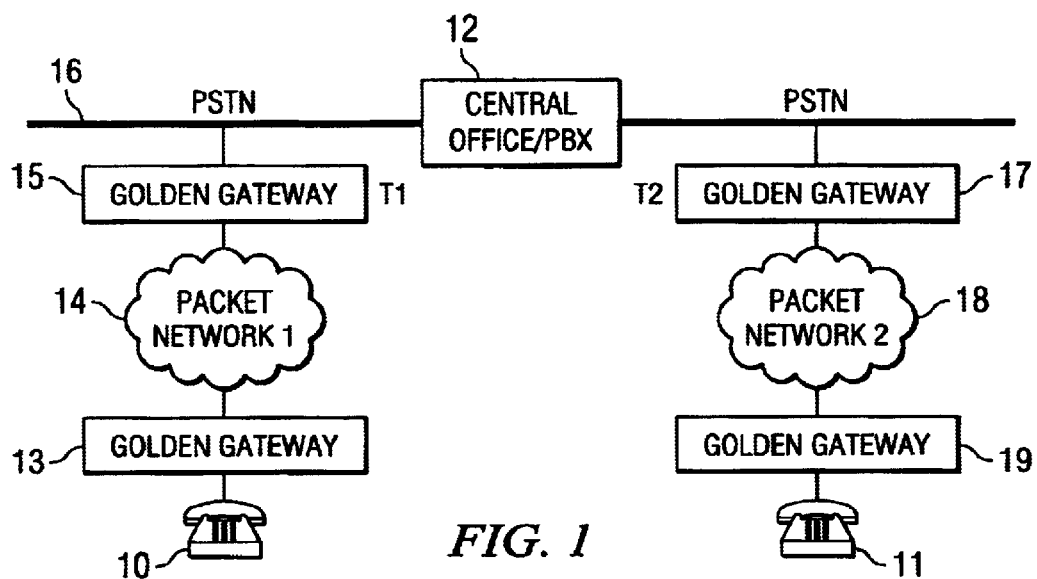
FIG. 1 is a block diagram illustrating a connection between two telephones on separate packet networks connected over a CO/PBX PSTN line.

As illustrated in FIG. 1, telecommunication equipment 10 and 11 (e.g., telephones) is connected through separate packet networks 14 and 18 over a PSTN line 16. During communication, the telephones 10 and 11 generate voice signals. The voice from first telephone 10 is converted into PCM code voice packets and compressed by gateway 13 and forwarded to gateway 15 over the packet network 14. Gateway 15, prior to the implementation of the present invention, assumes that it is passing the compressed PCM data to a terminal telecommunications equipment such as a telephone and therefore decompresses the data and converts the data to voice. However, in the illustrated embodiment, gateway 15 is actually passing the data to a third gateway 17. Gateway 17 likewise assumes that it is receiving from terminal telecommunications equipment and therefore anticipates non-compressed voice signals. Prior to implementation of the present invention, gateways 15 and 17 exchange voice signals after decompression of the PCM packets.

In order to implement the tandem transparent mode of the present invention once a voice connection has been established, the equipment on each side needs to inform the equipment on the other side of the connection that it is a connection forwarding agent, not terminal equipment. Therefore, in the exemplary embodiment, gateways 15 and 17 need to inform each other that each is a connection forwarding agent, not terminal equipment.

Figures 2, 3:
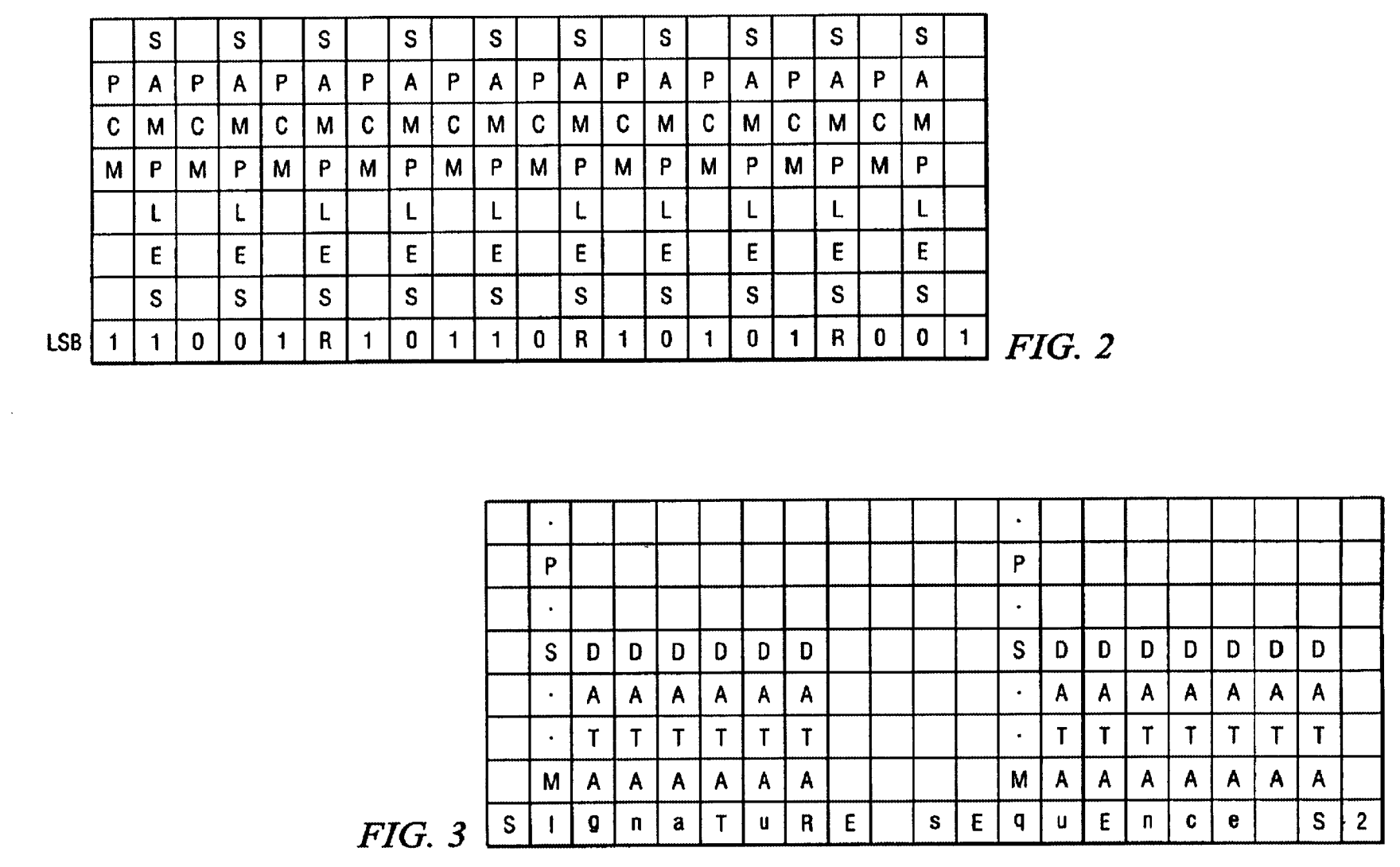

According to the exemplary embodiment of the present invention, a call is initiated by telephone 10. Gateway 15 decompresses the PCM packets and sends them over the CO/PBX. Gateway 15 also embeds and transmits a first signature sequence (S1) embedded in the least significant bits of the outgoing PCM samples, as illustrated in FIG. 2, to indicate that equipment 17 is a connection forwarding agent. The signature sequence S1 also indicates to any receiving gateway that gateway 15 seeks to initiate a tandem transparent mode of communication.

The first signature sequence (S1) can be embedded in the LSB of a u-law or a-law encoded PCM stream. The speech will remain intelligible with very little degradation in voice quality. The first signature sequence is a unique sequence of bits, which is sent out repeatedly, embedded in the least significant bits of the outgoing samples. In the exemplary embodiment of the present invention, FIG. 2, the first signature sequence (S1) is illustrated as the binary sequence 11001010. The first signature sequence (S1) can be any selected sequence defined as the first signature sequence for the particular implementation of the present invention. The illustrated exemplary first signature sequence starts with a 1 and ends in a 0, and the hamming distance between the sequence and any of its cyclic shifts is at least four. The exemplary sequence has the advantages that the beginning of the sequence is relatively easy to compute to identify its presence, in terms of mathematical complexity, even if distributed channel errors are present.

In certain situations, robbed-bit-signaling, as illustrated by the R's in the LSB locations in FIG. 2, may destroy some of the bits of the first signature sequence. In the example of FIG. 2, every sixth bit of the signature sequence has been destroyed due to robbed bit signaling.

On the receiving side, the receiving equipment 17 will look for the first signature sequence (S1), allowing for the potential errors, and if the signature sequence (S1) has been identified as present for a minimum duration of $T_1$, it will set a flag to authorize switchover to tandem transparent mode. Gateway 17 will also then begin transmission of signature sequence (S2) to gateway 15, assuming that prior to that it has transmitted signature sequence S1 for a sufficiently long time.

The first signature sequence (S1) is defined so as to identify the codec used by the sending equipment 15 so that the receiving equipment 17 will know the proper codec for decompression. As illustrates in more detail in FIGS. 5 and 6, the communicating equipment 15 and 17 must pass through tandem authorized mode before switching to tandem transparent mode wherein the voice packets are no longer decompressed and recompressed but instead are transferred over the PBX as compressed PCM. The first signature sequence is different for different codecs, thus allowing for incorporation of new codecs.

One factor to be considered is the probability of false detection of the signature sequence when it is actually not present. In one embodiment, algorithms can be utilized to employ all the constraints on the transmitted bit sequence in order to validate the existence of the signature sequence. For the purposes of computing the probability for this method, for a signature sequence of N bits in length (eight bits in the example above), when the start of the sequence is known, the presence of the sequence is acceptable if M bits out of N bits is correct. Then the probability of false identification of the sequence is the probability of randomly generating M (or more) correct bits out of N. If M is 6 in the example above, then the probability of incorrect identification is about 0.14. In the receiving side, the identification algorithm will operate by matching contiguous blocks of the bit-stream with the signature sequence. Let the number of blocks observed be K. Then, the probability of incorrect identification for all the blocks is the probability for one block raised to the power of the number of blocks. This can be a very small number. This algorithm will be applied to all the shifts of the input sequence that may last for a duration of D blocks. Therefore, an upper bound on the expected number of times the signature sequence will be detected for K consecutive blocks is:

$$ND\left(\frac{\left(\sum_{j=M}^{N} C_N^j\right)^K}{2^N}\right)$$

For a D corresponding to 500 ms, and K corresponding to 30 ms, the probability is less than $10^{-22}$. The algorithm considers every bit as a potential starting point and accepts it if M out of N bits match for K consecutive blocks. The above procedure is continued until the duration D has elapsed. D must have a limited duration to avoid the inevitable random generation of the signature sequence if duration is unlimited.

It is important not only that a switchover to tandem transparent mode occur when the signature sequence is detected but also that the switchover take place without interruption of service or loss of quality or signal. Therefore, the switchover occurs in two stages, first to tandem authorized mode and then to tandem transparent mode, FIGS. 5 and 6.

Once a switchover has been authorized on either side of the connection 15, that side will ensure that the opposite communicating equipment 17 has also transmitted back the same first signature sequence (S1) for at least $T_1$ milliseconds. After that, the communicating equipment 15 will start sending data in compressed packets, FIG. 3. Packets may be embedded with a different signature sequence (S2) (for example, 11110). A packet start marker (PSM) byte will mark the beginning of a packet. The packet start marker in the exemplary embodiment is not a complete byte but only seven bits because the LSB is used for the signature sequence (S2). The transmitted PCM stream will be filtered for the PSM byte, so that PSM occurs only when there is a packet. The packet data will be packed in four bits of the PCM output, immediately after the PSM byte. The exemplary embodiment illustrates a choice of four bits because of the low bandwidth requirements of 8Kbps low-bit rate codecs. However, this choice may be changed and indicated in the implementation by choosing a different signature sequence (S2).

Figure 4:
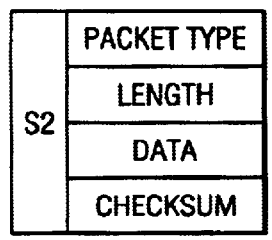
FIG. 4 is a diagram illustrating an exemplary embodiment for a packet structure for a tandem transparent mode packet.

The structure of an exemplary tandem transparent mode packet is illustrated in FIG. 4. The data packets consist of a header that has two fields: packet type and packet length. This is followed by the packet data. A checksum follows the packet data. The checksum is computed on the packet data and the two fields of the header in accordance with the specification corresponding to the packet type. The packet also includes the signature sequence (S2) in the LSB. The gateways continue to monitor for reception of the signature sequence (S2) to determine if the tandem transparent mode should be maintained.

Even after tandem transparent mode has been initiated and data are being transferred in compressed form, it may be necessary to switch out of tandem transparent mode to accommodate certain communicated signals, such as DTMF, or to accommodate loss of signature sequence (S2). It is important that the communications link be adapted to handle transitions with minimal signal loss.

Figure 5:
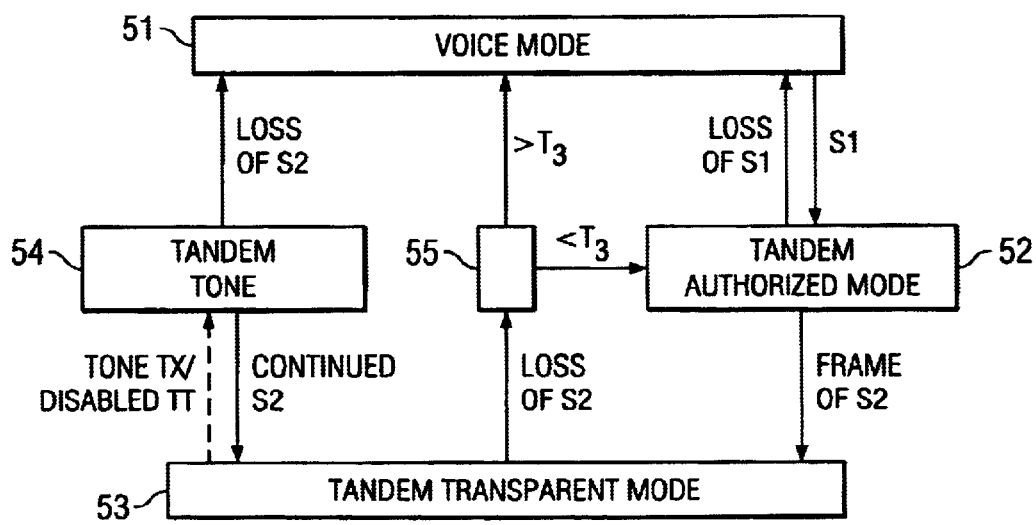
FIG. 5 is a state block diagram illustrating the connection states for an exemplary asynchronous tandem transparent mode connection.

FIG. 5 illustrates the state diagram for the tandem transparent mode, voice mode, tandem authorized mode, and tandem tone mode, suitable for setting up either an asynchronous packet router link, or a synchronous transfer, in which a packet is sent every frame. When a voice connection is established between two gateways with tandem transparent communication enabled, the system is in Voice Mode 51. Gateways 15 and 17 transmit signature sequence (S1) embedded in the PCM stream and transmit the voice as decompressed voice.

When gateway 17 recognizes reception of S1 for at least $T_1$, gateway 17 shifts to tandem authorized mode 52 and begins to transmit the voice as compressed data with S2 embedded as illustrated in FIGS. 3 and 4. When gateway 15 recognizes reception of S1 for at least $T_1$, gateway 15 shifts to tandem authorized mode 52 and begins to transmit the voice as compressed data with S2 embedded as illustrated in FIGS. 3 and 4. While in tandem authorized mode, both gateways 15 and 17 anticipate receiving signals as decompressed voice. Therefore, the compressed data received are treated as decompressed voice and will temporarily appear as noise until the receiving gateway shifts to tandem transparent mode.

When gateway 15 recognizes reception of S2 for at least $T_2$, gateway 15 shifts to tandem transparent mode 53 and continues to transmit S2. When gateway 17 recognizes reception of S2 for at least $T_2$, gateway 17 shifts to tandem transparent mode 53 and continues to transmit S2. In tandem transparent mode, both gateways 15 and 17 anticipate and receive compressed data in a format corresponding to the codec designated by signature sequence S2.

The incoming PCM samples are continuously monitored by the gateways 15 and 17 for the first or second signature sequences S1 and S2. If the first signature sequence is detected on the incoming PCM samples, a transition is made to tandem-authorized mode 52. In the tandem-authorized mode 53, the second signature sequence S2 is embedded in the outgoing PCM stream, FIG. 3. Also, the outgoing PCM samples are stuffed with the packets arriving from the packet network. However, the incoming samples (minus the LSB) are still passed on to the packet network 14 or 18 by the gateway 15 or 17 as voice samples.

If the incoming second signature sequence (S2) is momentarily lost 55, the system shifts to tandem authorized mode 52 and continues to monitor for S2 to return to tandem transparent mode 53. If S2 is received within a time period $T_3$, the system shifts back to tandem transparent mode 54. If S2 is not received for a duration greater than $T_3$, a transition is made to voice mode 51. In tandem transparent mode 53, the incoming samples are scanned for packets. Any packets that are found are passed on to the packet networks 14 and 18. Any packets coming from the packet networks 14 and 18 are stuffed into the outgoing PCM stream.

Signals such as DTMF tone or facsimile can present difficulties in transmission in tandem transparent mode because of the need for stable connection and/or signal degradation resulting from compression. The system can be designed to shift back to voice mode 51 when desired for optimal transmission of certain designated signals. The system can alternatively also include an optional fourth operational mode, tandem tone mode 54. If the communications equipment 15 or 17 generates a singling tone or an explicit command to end tandem transparent mode, the system can transition to the tandem tone mode 54. In this mode, tone or voice samples are transmitted across the CO/PBX 12. If the second signature sequence S2 continues to be received during this period, a return is made to tandem transparent mode 53. However, if S2 is lost, a transition is made to voice mode 51.

Figure 6:
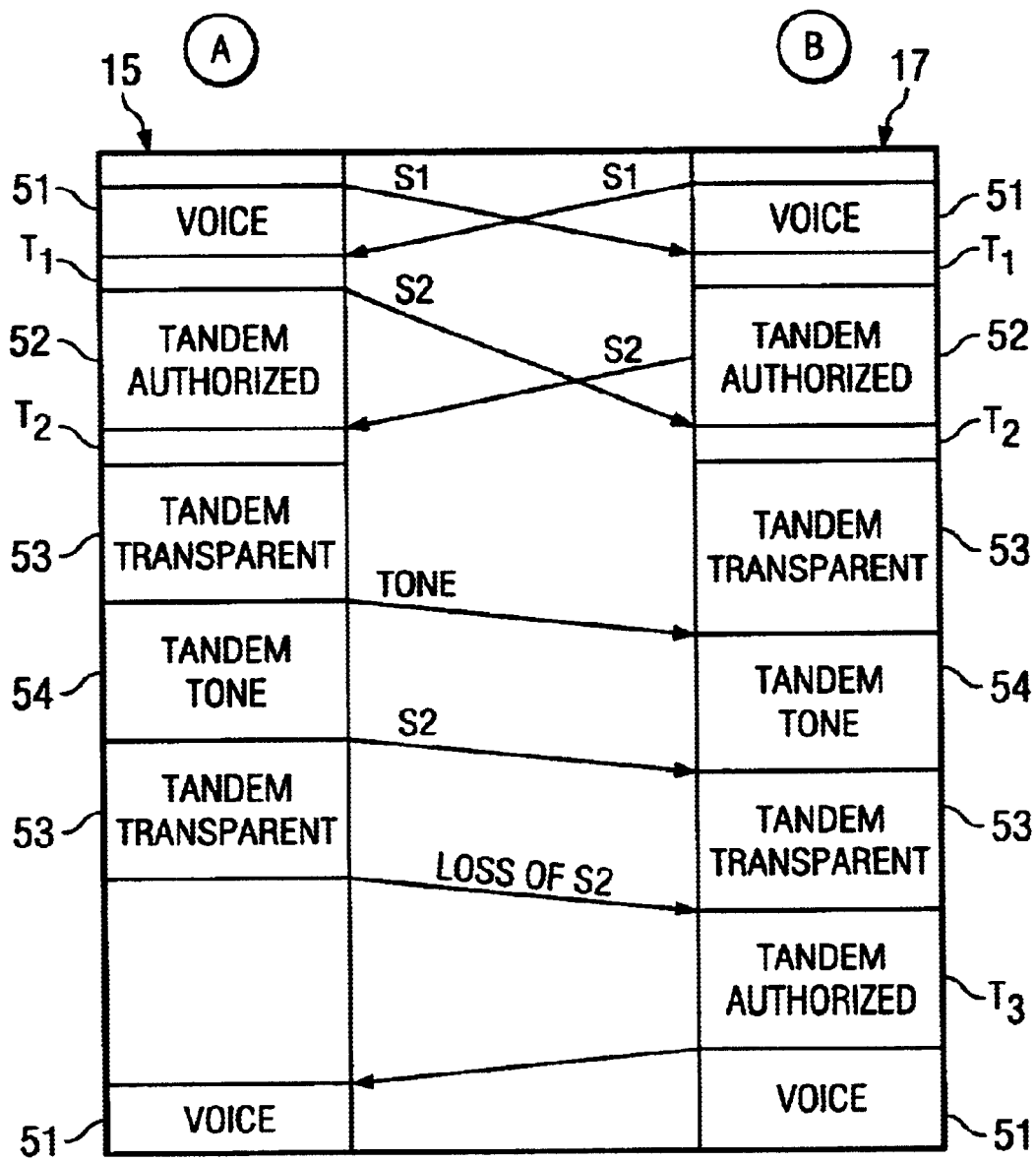
FIG. 6 is a transition diagram illustrating an exemplary embodiment of the negotiations of a tandem transparent mode.

FIG. 6 shows the negotiations that occur for a transition to tandem transparent mode 53 and the transition back to voice mode 51. Initially, sides A and B (gateway 15 and 17) are placed in voice mode and begin to transmit PCM voice samples with the first signature sequence S1 embedded in the LSB, FIG. 2. On detecting the first signature sequence S1, each side moves to tandem authorized mode 52 after a delay of $T_1$ and starts sending compressed data packets with the second signature sequence (S2) with the packets, FIG. 3. When each side detects the second signature sequence (S2) from the opposite side for a period of $T_2$, each side moves to tandem transparent mode 53.

The tandem transparent mode may be disturbed if one side is put out of it through an external command. For example, if the optional alternative tandem tone mode is enabled, and side A receives a command to generate a tone, side A will shift to tandem tone mode 54. In this mode, outgoing samples will correspond to a pure tone. In this mode packets are still received by gateway 15, but the outgoing samples are pure tone. When the tone is transmitted, side B, gateway 17, immediately switches to tandem authorized mode 52 and processes the tone. At the end of the tone, both sides switch back to tandem transparent mode 53 if side A resumes generation of S2. Otherwise, both sides will switch to voice mode 51.

A tone detection time out $Ttone_{max}$ can be established to determine if the tone is of too great a duration. If the tone is of too great a duration, both sides will shift to voice mode 51 for the duration of the tone. The gateways will then need to transition through tandem authorized mode 52 to return to tandem transparent mode 53 in the same sequence as when the connection was initially established. If $Ttone_{max}$ is set to 0, a transition is made to voice from any state the moment S1/S2 is lost because of tone generation or tone detection.

Alternatively, if the tandem tone mode is not enabled or is not present in the implementation of the invention, both sides will shift to voice mode upon the generation of a tone by either side.

If the S2 signal is lost from either side, the other side shifts to tandem authorized mode 52 for a time $T_3$. FIG. 6 illustrates a loss of S2 from side A and a shifting of side B into tandem authorized mode 52 for a period $T_3$. After the time period $T_3$, side B shifts to voice mode 51 if S2 is not received. In order to reestablish tandem transparent mode, both sides A and B must repeat the initial tandem transparent mode establishment sequence described above. In most applications, $T_3$ will be equal to $Ttone_{max}$.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A method for improving voice quality between packet networks, comprising the steps of:

detecting a communication link with compatible tandem codecs, one codec corresponding to each of a first and second packet network, wherein voice data is encoded according to a first codec in said first packet network and according to a second codec in said second packet network, including:

sending a first identification code from each of said first and second packet networks to the other packet network indicative of a forwarding module and indicative of the codec implemented by said packet network, wherein said first identification code includes a first signature sequence embedded in the least significant bits of outgoing PCM samples;

detecting said first identification code and determining compatibility;

establishing a transition communication mode;

transmitting a second identification code wherein said second identification code includes a second signature sequence embedded in the least significant bits of outgoing PCM samples embedded within said inter-network communication indicative of initiation of said transition communication mode; and establishing a transparent communication mode for passing packet data encoded according to said compatible codec, between said first and second networks without decompression;

maintaining said transparent communication mode by continued transmission of said second identification code within said inter-network communication.

2. The method of claim 1, wherein the step of establishing said transparent mode, includes:

detecting said second code for a predetermined time interval before establishing said transparent mode.

3. The method of claim 1, further including the step of:

monitoring said passed packets for said embedded second code and returning to said communication link with tandem codecs upon detection of the absence of said second code.

4. The method of claim 1, further including the steps of:

monitoring said passed packets for tone signals; and establishing a tone transmission mode between said packet networks.

5. A system for improved voice quality between packet networks, comprising:

first and second packet networks;

a PSTN line;

first telecommunication terminal equipment connected to said first packet network;

second telecommunication terminal equipment connected to said second packet network;

first forwarding module connected to said first packet network and to said PSTN line and capable of a plurality of operational modes, including a standard tandem codec communication mode, a transition communication mode and a transparent communication mode;

second forwarding module connected to said second packet network and to said PSTN line and capable of a plurality of operational modes, including a standard tandem codec communication mode, a transition communication mode and a transparent communication mode;

said tandem codec communication mode including a codec corresponding to each of a first and second packet networks, wherein voice data is encoded according to a codec in said first packet network and according to a codec in said second packet network and is passed across said PSTN line without encoding;

means for sending a first identification code embedded in a least significant bit of outgoing PCM samples from each of said first and second forwarding modules over said PSTN line identifying said sending forwarding module as capable of said transparent communication mode and indicative of the codec implemented by said packet network associated with said forwarding module;

means for detecting and distinguishing said first identification code embedded within said least significant bit of incoming PCM sample;

means for shifting said forwarding module from said tandem codec mode to said transition mode;

means for sending a second identification code embedded in a least significant bit of outgoing PCM samples from each of said first and second forwarding modules over said PSTN line indicative of the operational mode of said forwarding module;

means for detecting and distinguishing said second identification code embedded within said least significant bit of incoming PCM sample;

means for shifting said first and second forwarding modules into said transparent communication mode for passing packet data encoded according to said compatible codec between said first and second networks across said PSTN line;

means for maintaining said transparent communication mode by continued transmission of said second identification code embedded within a least significant bit of outgoing PCM samples within said inter-network communication.

6. The system of claim 5, wherein the said means for shifting into said transparent communication mode, includes means for detecting said second code for a predetermined time interval before establishing said transparent mode.

7. The system of claim 5, further including:

means for monitoring said passed packets for said embedded second code and returning to said communication link with tandem codecs upon detection of the absence of said second code.

8. The system of claim 5, further including:

means for monitoring said passed packets for tone signals and for establishing a tone transmission mode between said packet networks.

9. The transmission system of claim 5, wherein said second identification code is embedded within said inter-network communication packets.

\* \* \* \* \*